United States Patent [19]

Montes et al.

[11] Patent Number: 4,807,200
[45] Date of Patent: Feb. 21, 1989

[54] METHOD AND APPARATUS FOR GATHERING SEISMIC DATA AND SELECTIVELY CONTROLLING ISOLATED DISTRIBUTED RECORDERS IN AN ISOLATED DISTRIBUTED RECORDING SYSTEM

[75] Inventors: Raul R. Montes, Houston; Richard J. Kostelnicek, Dickinson, both of Tex.

[73] Assignee: Exxon Production Research Company, Houston, Tex.

[21] Appl. No.: 32,201

[22] Filed: Mar. 26, 1987

[51] Int. Cl.[4] ............................................. G01V 1/22
[52] U.S. Cl. .................................... 367/76; 346/33 C
[58] Field of Search ...................... 367/39, 40, 41, 42, 367/76, 77, 133; 346/33 C; 455/4

[56] References Cited

U.S. PATENT DOCUMENTS

| | | | |
|---|---|---|---|
| 3,264,606 | 8/1966 | Crook et al. | 367/39 |
| 4,147,222 | 4/1979 | Patten et al. | 367/133 |
| 4,639,901 | 1/1987 | Warmack et al. | 367/77 |

Primary Examiner—Thomas H. Tarcza
Assistant Examiner—Ian J. Lobo
Attorney, Agent, or Firm—Raul R. Montes

[57] ABSTRACT

A method and apparatus for selectively controlling isolated distributed recorders in an Isolated Distributed Recording System. Selection and control of isolated distributed recording units comprising a seismic data gathering Isolated Distributed Recording System are effected by transmitting preselected encoded acoustic seismic signals to which the isolated distributed recorders have been preconditioned to respond by effecting a desired control action. The same encoded acoustic seismic signal may also provide the seismic data for the experiment. Each isolated distributed recorder is conditioned to respond to several encoded acoustic signals, to discriminate against noise, and/or to respond to one such encoded acoustic signal by effecting a plurality of control actions at the isolated distributed recorder. The method and apparatus of the invention, thus, provided a large number of combinations for seismic data acquisition and control to fit the requirements of seismic data gathering operations effected in accordance with common depth points methods or other seismic exploration methods.

34 Claims, 2 Drawing Sheets

METHOD AND APPARATUS FOR GATHERING SEISMIC DATA AND SELECTIVELY CONTROLLING ISOLATED DISTRIBUTED RECORDERS IN AN ISOLATED DISTRIBUTED RECORDING SYSTEM

FIELD OF INVENTION

This invention relates generally to the field of seismic geophysical exploration. More particularly, this invention relates to a method and apparatus for selectively controlling isolated distributed recorders in an Isolated Distributed Recording System.

BACKGROUND OF INVENTION

In conventional seismic exploration, field operations are preceded by the preparation of seismic plans in which lines are drawn on a map to indicate where seismic experiments will be conducted. Such seismic plans also set forth such other requirements as: the field configurations (geometrical patterns) of geophones desired for each seismic experiment, the number and sequence of all the seismic experiments to be conducted, the quantity of data to be collected, and the manner in which the data will be collected. The plan is prepared to insure the effective collection of data which will yield the most useful information concerning the underlying formations of a particular geographic area.

As with any scientific experiment, the quantity and quality of data obtained directly affects the ability to predict results from the data. In seismic exploration, the quantity and quality of data directly affects the ability of the geophysicist to make predictions about the subsurface geology. One way to improve the quality of data is to make multiple observations of the same subsurface reflecting points within a formation. Multiple observations allow better interpretation of data and, through the use of known "noise reduction" techniques, multiple observations also allow the elimination of undesired signal components during subsequent data processing.

Field methods for obtaining multiple data on common reflecting points are generally referred to as "stacking" or "Common Depth Point" surveying methods. Stacking methods include the performance of numerous seismic experiments utilizing varying geophone or geophone-array geometrical configurations. Stacking methods also involve switching the data gathering operation from one active geophone to a group of active geophones.

It is well known that energy traveling in the horizontal plane away from a seismic energy source arrives at different geophone groups at different times. The first arrival occurs at the geophone group nearest the source, and then progresses to those increasingly further away from the source. The result is that even though groups of geophones are typically connected electrically by wires so that data is recorded as though there exists only one geophone, horizontally traveling energy (which generally provides little information about deep formations) is recorded out of phase, and some signals cancel other signals. Energy traveling in the vertical plane, on the other hand, arrives at the geophones at about the same time, or more or less in phase, so signals tend to reinforce each other. Vertically traveling energy, which provides the most useful information concerning the underlying regions, is thus more easily perceived in the data record sections. These concepts, combined with advances in seismic instrumentation, provide an opportunity during data gathering and data processing to cancel out unwanted signals detected at the geophones. Data recording is thus typically effected through geophones and arrays of geophones arranged in the field so as to take advantage of well established "noise" cancellation techniques. Noise cancellation techniques and methods also involve arranging the geophones in the field so as to cancel specific types of noise for a specific situation. For example, geophones in a group may be unevenly spaced or "tapered" in order to specifically reduce the type of noise encountered in a particular area. The arrangement and rearrangement of geophones in the field involve numerous connections and disconnections of geophones, groups of geophones and arrays of geophones. Field control of these connection and disconnection operations is typically effected by connecting all geophones in the field to the recording equipment via an electrical cable.

The cables utilized in seismic data gathering operations are typically very complex cables that contain numerous instruments along their lengths. These cables are utilized, for example, to effect the simple connect-/disconnect operations and to effect other control functions within the array of geophones. These functions control the gathering of data in the field to fit the stacking plans and other requirements of the particular field experiment.

Field control of data gathering in accordance with stacking plans and other field techniques and requirements are important concepts in seismic exploration. These requirements demand flexibility in field operations and require data gathering instruments which can continuously control the parameters required to set-up the various field experiments.

In "Cable Systems", control is exercised by transmitting signals along these long and complex cables to effect the desired control functions within the data gathering system. Selected geophones and/or recorders are activated to detect and store the seismic data. Control signals transmitted through these cables control the simple connect-disconnect operations for single geophones or entire groups of geophones, usually prior to the recording period, in the process of expediting spread set-up for common-depth-point recording. Control signals may also be employed to connect individual geophones within each group to change the array geometry as a function of time. Control signals are further utilized to change individual seismometer amplitude settings and phase settings; this permits time variable beam steering as well as adjusting the frequency response of entire groups or individual geophones. Control of seismometer amplitudes settings and control of phase settings are functions useful in attenuating noise. By changing the dimensions of geophone arrays as well as amplitude and phase responses during the recording period, reflection-signal- to-noise ratios can be maximized.

It is now desirable to extend the control of data gathering operations to cableless distributed control systems. Advances in the area of seismic data gathering instrumentation have made it possible to distribute portions of the data processing and data recording functions to wireless ("isolated") recording stations ("isolated distributed recorders"). These "Isolated Distributed Recording Systems" eliminate the need for complex cable interconnections and provide greater flexibility in field operations. Isolated Distributed Recording Systems are particularly useful in areas of rugged or mountainous terrain, where the use of cable systems is greatly restricted. In place of the interconnecting cable system, which provides the communication/control link on a distributed cable system, Isolated Distributed Recording Systems utilize a Radio-Telemetry System or a Time Synchronization System.

Control of field data gathering operations in current Isolated Distributed Recording Systems may briefly be described as follows:

Radio-Telemetry Systems utilize coded radio commands to selectively activate isolated distributed recorders. Coded radio commands are also employed to control the frequency response of individual geophones or entire geophone groups. U.S. Pat. No. 3,916,371 to Broding is an example of a geophone control system which may be employed in a Radio-Telemetry System as well as in a Distributed Cable System.

Radio-Telemetry Systems, however, suffer from difficulties in reliably transmitting and receiving the radio frequencies that are usually allocated to this type of service. To a large extent, this has resulted from the difficulties inherent in separating the radio waves emanating from the individual transmitting devices and separately amplifying them without incurring serious "cross-talk" or distortion. Cross-talk occurs when a portion of one signal mixes with or overlays another signal. This difficulty is exacerbated by the fact that the individual distributed recorders or groups of recorders in a seismic plan are usually addressed by different encoded radio commands. Also, radio-controlled systems may use radio frequencies that are effective only along line-of-sight; such systems are often not effective in mountainous or obstructed terrains. Finally, in some areas, it is difficult or impossible to obtain permits for radio transmissions. Without these permits Radio-Telemetry Systems cannot be employed.

Time Synchronization Systems utilize an accurate time reference and a preselected time recording logic to operate the isolated distributed recorders independently of the central control station. Representative Time Synchronization Systems are disclosed in U.S. Pat. Nos. 4,281,403 to Siems, et al; 3,972,019 to Bassett; and 3,733,584 to Pelton, et al.

The preselected time recording logic eliminates radio transmission of control signals between each isolated unit and the central control station. Recording of seismic data at each isolated distributed recorder is either continuous (usually for one day, while a seismic survey is being "shot") or in accordance with a preselected time logic which effects recording at selected time periods regardless of whether seismic signals are being generated. Operation of geophone arrays is preselected and may not be altered except by changing the preselected conditions at each individual isolated distributed recorder.

A disadvantage of Time Synchronization Systems lies in the separation of the recording function and the seismic signal transmitting function. These functions are independent of each other. In a Time Synchronization System the recording periods, geophone array, amplitude response, frequency response, filter settings and other experimental variables are fixed in accordance with the preselected settings effected at each isolated distributed recorder. Flexibility of field operations is limited to the preselected settings. Control functions such as frequency control, array geometry control and-/or individual seismometer amplitude and phase control is limited to a preselected time synchronization plan. A change in any variable would require adjustments to the individual isolated distributed recorders. This is an impractical, time consuming, and costly proposition, particularly when it is desirable to change field variables in accordance with stacking plan surveying and other noise reduction methods.

There exists, therefore, a need for a method and an apparatus for controlling the field functions of isolated distributed recorders in an Isolated Distributed Recording system which do not require complex cable interconnections, radio transmissions, nor dependency on a preselected recording time and function logic to control the recording of seismic data during seismic exploration activities.

SUMMARY OF THE INVENTION

This invention describes a method and apparatus for selectively controlling units in an array of isolated distributed recorders in accordance with a seismic plan. Selection and control of the isolated recording units are effected by transmitting preselected encoded acoustic signals to which isolated distributed recorders have been preconditioned to respond by effecting a desired control action. Such encoded acoustic signals may be encoded seismic signals. In the preferred embodiment of the invention, the encoded signals serve a dual purpose: (1) the signal is employed to trigger a system into operation or to effect some other desired function at an isolated recording system, and (2) the same signal itself may simultaneously generate the seismic data for the experiment.

Each isolated distributed recorder is preconditioned to respond to several encoded acoustic signals to allow the selection of units in an array or to effect some other control action. If an array of geophones is connected to an individual isolated distributed recorder, the encoded signals may be employed to activate selected geophones from this array.

In other words, encoded signals may be employed to engage different combinations of distributed recorders and/or to engage different combinations of geophones associated with any one particular distributed recorder. In addition, encoded acoustic signals are utilized at an isolated distributed recorder to control such functions as setting amplitude response, phase response, noise filter levels, rate of data gathering, and where and/or whether data detected is stored and time referenced.

The transmitted encoded acoustic signal may be employed to control the actions of an isolated distributed recorder prior to, during, or after data gathering.

An example of an encoded acoustic signal (which may also be a data signal) which is useful for purposes of selection and control of individual units in an Isolated Distributed Recording System is a signal coded in accordance with a binary code of maximal length. The transmitted signal is detected at each isolated distributed recorder, where it is correlated with programmed correlating encoded signals, and, upon sufficient correlation between the detected encoded acoustic signal and the correlating encoded signals at one or more isolated distributed recorders, one or more control actions are effected within the Isolated Distributed Recording System.

In addition, the encoded acoustic signal and the seismic information associated with its transmission may be stored and time referenced for purposes of obtaining information regarding the subsurface geology.

BRIEF DESCRIPTION OF THE DRAWINGS

The invention is illustrated in the accompanying drawings wherein.

These drawings are not intended as a definition of the invention, but are provided solely for the purpose of illustrating certain preferred embodiments of the invention, as described below.

DESCRIPTION OF THE PREFERRED EMBODIMENT

This invention concerns a method and apparatus for selectively controlling units in an array of isolated distributed recorders in accordance with a seismic plan. Selection and control of the isolated recording units are effected by transmitting preselected encoded acoustic signals to which isolated distributed recorders have been preconditioned to respond by effecting a desired control action. Such encoded acoustic signals may be encoded seismic signals. In the preferred embodiment, the encoded signals serve a dual purpose: (1) the signal is employed to trigger a system into operation or to effect some other desired function at an isolated recording system, and (2) the signal itself may simultaneously generate the seismic data for the experiment. In other words the encoded acoustic signal is used for purposes of selection and control and also for providing the seismic data for the experiment.

Figure 1:
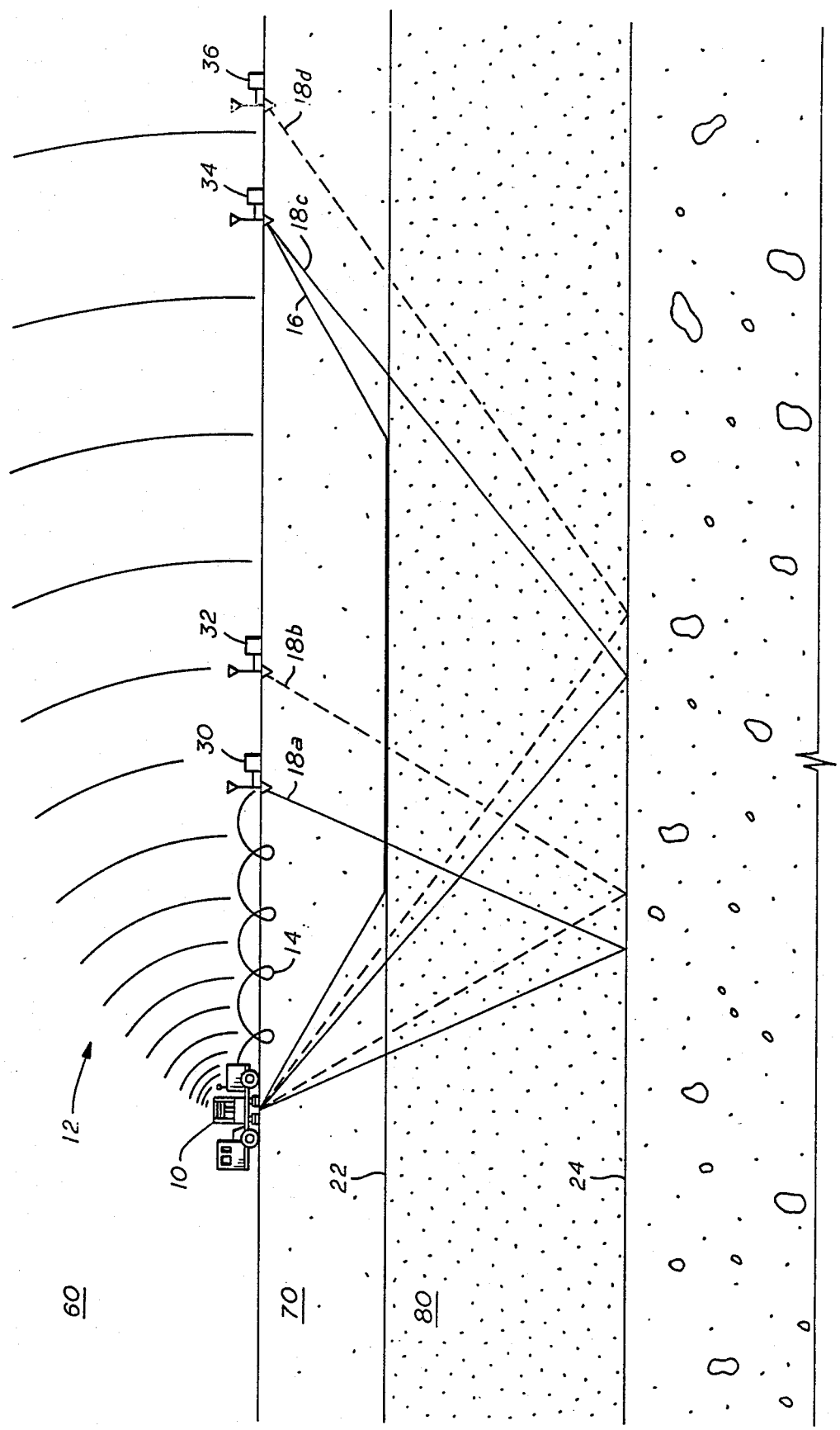
FIG. 1 is a schematic diagram showing the preferred embodiment of the apparatus of the invention.

The invention will now be described in detail with reference to the accompanying drawings. FIG. 1 schematically illustrates a portion of an Isolated Distributed Recording System for conducting seismic exploration operations in accordance with the invention.

In its most basic aspect, the method entails the implementation of a seismic field plan in accordance with the present invention. Such a plan relates to, among other things, the geometrical configuration or distribution, of isolated distributed recording units over the field survey region in accordance with a data gathering scheme in a manner to accomplish effective data gathering. Each isolated distributed recorder is, pre-programmed or "preconditioned" to respond selectively to one or more encoded acoustic signals by effecting one or more control actions; said encoded acoustic signals have a unique signal characteristic corresponding to a preselected code.

An encoded acoustic signal is transmitted, utilizing any of various acoustic energy sources which are routinely employed for seismic exploration, for the purpose of producing one or more desired control actions in the Isolated Distributed Recording System. The transmitted encoded acoustic signal is detected at the geophones of each isolated distributed recorder, where it is correlated with stored correlating encoded signals. Each correlating encoded signal has a unique signal characteristic corresponding to the same coding basis utilized in generating the encoded acoustic signal such as, for example, a binary code of maximal length, as more fully described below. The correlating encoded signals are uniquely associated with one or more preselected control actions at each isolated distributed recorder so that, upon sufficient correlation between the detected encoded acoustic signal and the isolated distributed recorder's programmed correlating encoded signal, one or more control actions at said isolated distributed recorder is activated. Such control actions may include: selecting the geophones in the array which will store the data; selecting the isolated distributed recorder's amplitude and phase settings; selecting the rate of data sampling at each isolated distributed recorder; and selecting the configuration of isolated distributed recorders within the Isolated Distributed Recording System which will be activated for data gathering operations in a particular field experiment. As will be recognized by those skilled in the art, other control functions, not specifically mentioned above, may also be effected within a seismic data gathering Isolated Distributed Recording System in accordance with this invention.

Each detected encoded acoustic signal may also be stored together with all seismic information associated with the generation and transmission of said encoded acoustic signal. Data recorded is referenced to the time of its generation for the purpose of obtaining useful information about the sub-surface geology. Fundamentally, the seismic signals are employed as information carrying media. The information carried is used for the purposes of selection and control of isolated distributed recorders and geophones within an Isolated Distributed Recording System and also for providing the seismic data of each experiment.

With reference to the accompanying drawings and, in particular, with reference to FIG. 1, an acoustic energy source, figuratively shown as a seismic vibrator 10, is utilized to generate an encoded acoustic signal in a manner well known in the art. The signal is continuously varied in frequency so as to be nonrepetitive in frequency during a time interval which is at least twice as long as the travel time of seismic waves from the earth's surface to the deepest seismic wave reflecting horizon of interest.

An example of a technique for encoding acoustic signals useful for purposes of selection and control of selected units in an Isolated Distributed Recording System is disclosed in U.S. Pat. No. 3,264,606 by T. N. Crook et al. Such signals are known as binary codes of maximal length, or more commonly, as pseudo-random codes. These codes are formed by operating on a binary seed code group of length N digits according to a predetermined rule of formation such that the resultant code does not repeat itself in less than $2^{N-1}$ digits. The number of autocorrelation codes so formed is numerically a large value when the codes are aligned and is nearly null for all other relative displacements. The codes are suitable for generation by established vibratory technique after being convolved with a seismic pulse to limit the code bandwidth. Furthermore, such codes have small correlation between members of the same length but of different seed code groups and are, thereby, suitable for effecting selection and remote control.

According to a more specific aspect of the invention, the seismic signal is formed according to a binary code of maximal length. Transmitting a binary code of maximal length into the earth in the form of a seismic signal presupposes that some characteristic of the seismic signal has two distinct conditions. For example, the amplitude may be varied between two magnitudes, or the phase may be varied between two phase relationships.

In a preferred embodiment of the invention, the transmitted signal is a constant frequency sinusoidal signal of constant amplitude the phase of which is varied between mutually opposite phase relationships in accordance with a binary code of maximal length. The signal will preferably have a duration of at least twice the travel time of seismic waves between the earth's surface and the deepest seismic wave reflecting horizon of interest.

An alternative but more restricted example of an operational encoded signal is furnished by two modes of the sweep of a single vibrator, eg., one an up-sweep, the other a down-sweep. Both signals have similar autocorrelation and, thereby, yield the same information about the earth subsurface geology. These sweeps, however, are of low correlation one with other. Therefore, such sweeps may additionally be used to exercise two function selection and control of remote data recording units.

Preferably, the encoded signal is of such a nature that it would be very unlikely that it would occur from any other source, either natural or man-made. For example, the isolated distributed recorder may be preconditioned to selectively discriminate against earthquake, wind or other types of undesirable acoustic signals. Encoding techniques are not new and have been employed in such other areas as radar for distinguishing the "useful" signals from noise.

When seismic vibrator 10 is activated to generate an encoded acoustic signal in a particular field application, several distinct encoded acoustic waves or "waveforms" are also simultaneously created. The various waveforms created when seismic vibrator 10 is activated are illustrated in FIG. 1. Such waveforms are: air pressure waves 12, which propagate in atmosphere 60; surface waves 14, which travel through the earth's near-surface 70; seismic refractions 16 which travel along a refractive horizon 22 in a subterranean formation for some distance and then return to the surface; and seismic reflections 18a, 18b, 18c and 18d which propagate into subterranean earth formation 80 and are reflected from a sub-surface reflecting horizon 24. Although created simultaneously, these different waveforms may not arrive at the at the isolated distributed recorders, for example, 30, 32, 34, and 36, at the same time. The velocity of propagation of each waveform, for example, depends on the medium's physical state (solid, liquid or gas) and, to a lesser extent, on the temperature and pressure of the substance. Each of these waveforms, however, contains the identical code information imparted by energy source 10, and the encoded signal can be processed regardless of whether the first event to arrive at the isolated distributed recorder is an air pressure wave, a seismic refraction, or a seismic reflection.

A plurality of isolated distributed recorders, for example, 30, 32, 34, and 36 are located at the site of the experiment in accordance with an overall seismic "shooting" plan. Encoded signals received at the isolated distributed recorders are continuously correlated with stored preselected correlating signals. Modern microcomputer techniques make these correlations practical. When an encoded acoustic signal shows sufficient correlation with the preselected signal at the isolated distributed recorder, the recording system is activated in accordance with the programmed preselected action. The preselected central action may consist of selecting the groups of geophones to be activated in accordance with a seismic plan requirement to form the desired seismic spread for the particular experiment (so as, e.g., to be most sensitive to substantially vertically-traveling seismic waves and to discriminate against other seismic waves and/or signals), setting seismometer amplitude control, phase control, or setting the corresponding initial gain or filter circuits for each group of geophones. In accordance with a seismic plan, data storage may commence at the time the seismic data were generated by an acoustic energy source and continue until all waveforms associated with significant transmitted seismic data are stored. Significant transmitted seismic data includes all seismic data associated with the generation of an encoded acoustic signal by an acoustic, or "seismic", energy source which is received at an isolated distributed recorder.

With reference to FIG. 1, signals 18a and 18c (shown as solid lines) illustrate that certain control actions at isolated distributed recorders 30 and 34 may be effected (such as activating data recording) while isolated distributed recorders 32 and 36 remain unaffected by corresponding signals 18b and 18d. In this illustration isolated distributed recorders 30 and 34 were preconditioned to respond to the encoded signal and isolated distributed recorders 32 and 36 were preconditioned not to respond to the same transmission.

Common depth point set-ups can thus be readily achieved by merely controlling the signal characteristic of each transmitted signal. The fact that each isolated distributed recorder may be preconditioned to effect one or more preselected control actions in response to any one transmitted encoded acoustic signal increases the possible numbers of combinations and control actions which may be effected when practising under the method of this invention.

FIG. 1 implicitly also illustrates that one encoded seismic signal may be utilized to effect different control actions at different isolated distributed recorders within the Isolated Distributed Recording System. The number of isolated distributed recorders within a System and the quantity, type and quality of data, will determine the number of unique encoded acoustic signals required to perform a particular experiment.

Figure 2:
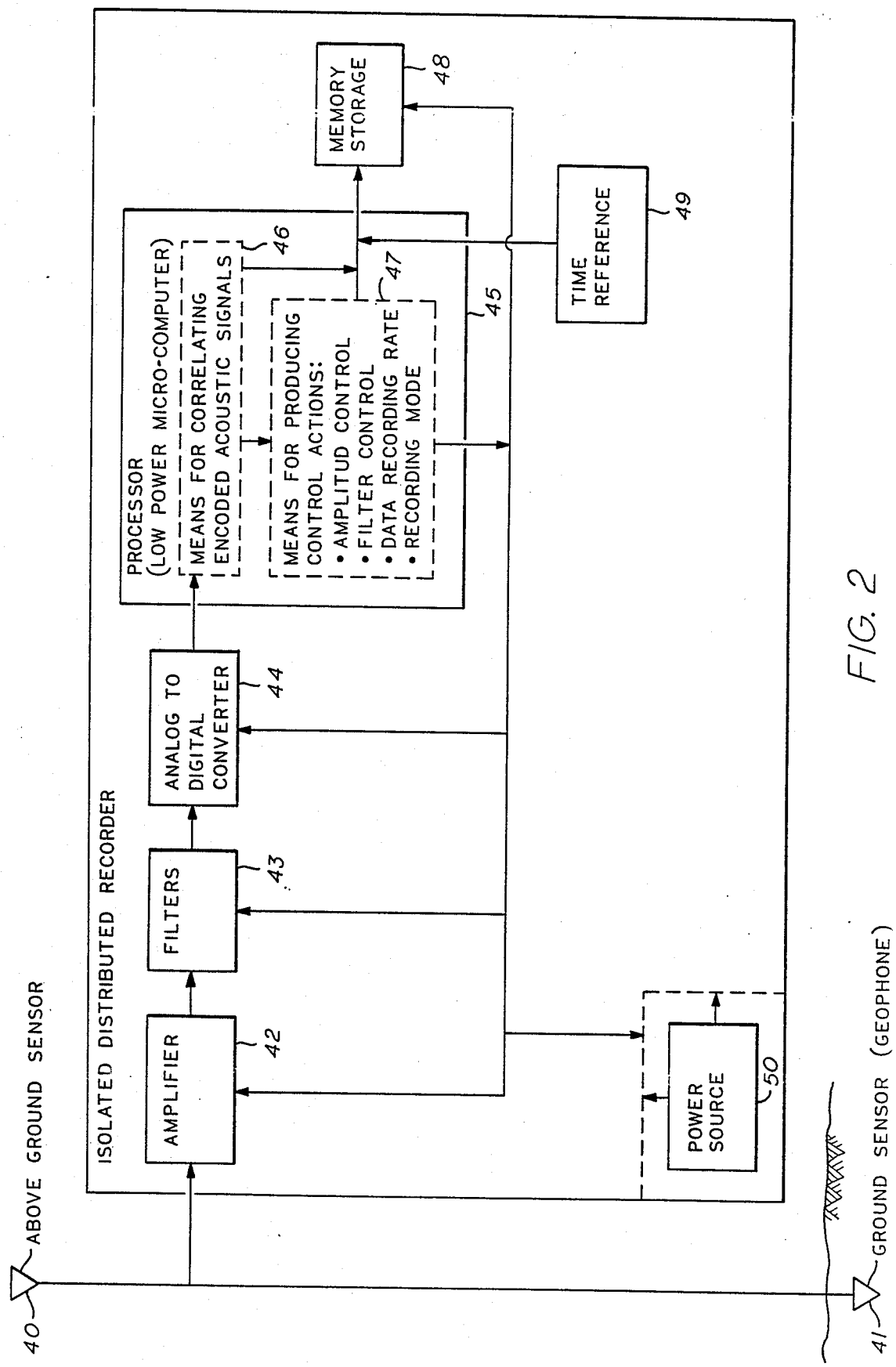
FIG. 2 is a block diagram showing an isolated distributed recorder in accordance with the present invention.

FIG. 2 is a block diagram showing an isolated distributed recorder in accordance with the present invention. With reference to FIG. 2, sensors 40 or 41 detect an encoded signal, 12, 14, 16, 18a, 18b, 18c or 18d. The detected signal then passes to amplifier 42. The amplified signal may be sent through frequency filters 43. Frequencies which are considered to contain no relevant information are thereby removed. The filtered encoded signal is sent to analog-to-digital converter 44. The digitized data are then sent to processor 45, which can be a low power microcomputer. The digitized encoded signal is correlated in processor 45 with a preselected stored correlating signal, and, upon sufficient correlation, processor 45 actuates the desired function at the isolated distributed recorder. The correlation of an encoded signal with a preselected stored correlating signal may be effected in processor 45 by providing processor 45 with means 46 consisting of software, hardware, or software/hardware combination necessary to effect this function. Likewise, a means 47 for producing a desired control action may also be included in such software/hardware package. Details of such software/hardware items are well known in the art, and it is not necessary to describe them in further detail herein. Alternatively, correlation of an encoded signal and a preselected, stored signal may also be accomplished, for example, by means of conventional electronic circuitry or a shift registry device, both of which are well known in the art.

Storage of significant seismic data received prior to the occurrence of the triggering signal may be accomplished by utilizing time-delay electrical circuitry which places the significant seismic data in temporary storage while the correlation function is taking place in parallel electrical circuitry. The same function also may be accomplished by placing the digitized encoded signal, including all seismic information associated with the generation of the encoded signal, in the temporary storage of microcomputer circuitry during correlation of the signals. The isolated distributed recorders will preferably contain time reference 49, which may be a clock, in order to identify the time of arrival of the seismic data which are recorded in memory 48. By way of explanation, and not by way of limitation, a Time Synchronization System may be employed for accurately referencing the time of arrival at the isolated distributed recorder of the encoded signal or all seismic data and information associated with the generation of the encoded signal to the time said encoded signal or seismic data and information were generated by the acoustic energy source. Generally, such a system would include an accurate clock or other timing device at the central station, and each isolated distributed recorder would also have an equally accurate timing device or "local" clock having a known relationship with the timing device at the central station. Usually, the local clocks are synchronized with the clock at the central station prior to the initiation of active seismic exploration activities. As an example, one such Time Synchronization System suitable for use in the preferred embodiment of the present invention is disclosed in U.S. Pat. No. 4,281,403 to Siems, et al., which is incorporated herein by reference thereto.

Changes and modifications to the specifically described embodiments can be carried out without departing from the scope of the invention, which is intended to be limited only by the scope of the appended claims.

We claim:

1. A method for gathering seismic data and remotely controlling isolated distributed recorders in an Isolated Distributed Recording System, comprising the steps of:
    (a) preconditioning individual isolated distributed recorders in an Isolated Distributed Recording System to respond selectively to an encoded acoustic waveform by effecting a control action at the isolated distributed recorders, said encoded acoustic waveform having a unique signal characteristic;
    (b) transmitting said encoded acoustic waveform utilizing an acoustic seismic energy source for the purpose of producing said control action in said Isolated Distributed Recording System:
    (c) detecting said encoded acoustic waveform at each isolated distributed recorder and correlating said detected encoded acoustic waveform with correlating encoded signals at each isolated distributed recorder, at least one of said correlating encoded signals being uniquely associated with said control action at at least one isolated distributed recorder; and
    (d) effecting said control action at said Isolated Distributed Recording System upon correlation between said transmitted encoded acoustic waveform and said at least one correlating encoded signal at at least one isolated distributed recorder.

2. The method of claim 1 wherein said unique signal characteristic corresponds to a code based upon a version of a vibrator sweep.

3. The method of claim 1, further comprising the step of:
    (e) storing said detected encoded acoustic waveform at said at least one isolated distributed recorder.

4. The method of claim 3, further comprising the step of:
    (f) referencing the time of arrival of said detected encoded acoustic waveform to the time said detected encoded acoustic waveform was transmitted.

5. The method of claim 1 further comprising the step of:
    (g) changing said encoded acoustic waveform's unique signal characteristics and repeating steps b, c, and d for the purpose of effecting a plurality of control actions within the Isolated Distributed Recording System.

6. The method of claim 1 wherein said transmitted encoded acoustic waveform is an encoded seismic signal.

7. The method of claim 1 wherein said transmitted encoded acoustic waveform is an encoded air-pressure wave.

8. The method of claim 1 wherein said transmitted encoded acoustic waveform is generated by at least one seismic vibrator.

9. A method for gathering seismic data and remotely controlling isolated distributed recorders in an Isolated Distributed Recording System, comprising the steps of:
    (a) preconditioning individual isolated distributed recorders in an Isolated Distributed Recording System to respond selectively to encoded acoustic waveforms by effecting at least one control action at the isolated distributed recorders, said encoded acoustic waveforms having a unique signal characteristic corresponding to a binary code of maximal length;
    (b) transmitting said encoded acoustic waveforms utilizing an acoustic seismic energy source for the purpose of producing said at least one desired control action in said Isolated Distributed Recording System;
    (c) detecting said encoded acoustic waveforms at each isolated distributed recorder and correlating said detected encoded acoustic waveforms with correlating encoded signals at each isolated distributed recorder, each of said correlating encoded signals having a unique signal characteristic in accordance with said binary code of maximal length and being uniquely associated with at least one preselected control action at each isolated distributed recorder;
    (d) effecting said at least one control action at said Isolated Distributed Recording System upon correlation between said transmitted encoded acoustic waveforms and at least one of said correlating encoded signals at at least one isolated distributed recorder;
    (e) storing said detected encoded acoustic waveforms at said at least one isolated distributed recorder; and
    (f) referencing the time of arrival of said detected encoded acoustic waveforms to the time said detected encoded acoustic waveforms were transmitted.

10. The method of claim 9 further comprising the step of:
  (g) changing said unique encoded acoustic waveforms' characteristics in accordance with said binary code of maximal length and repeating steps b, c, and d for the purpose of effecting a plurality of control actions within the Isolated Distributed Recording System.

11. The method of claim 9 wherein said transmitted encoded acoustic waveforms comprise encoded seismic signals.

12. The method of claim 9 wherein said transmitted encoded acoustic waveforms comprise encoded air-pressure waves.

13. The method of claim 9 wherein said transmitted encoded acoustic waveforms are generated by at least one seismic vibrator.

14. A method for gathering seismic data and remotely controlling isolated distributed recorders in an Isolated Distributed Recording System, comprising the steps of:
  (a) preconditioning individual isolated distributed recorders in an Isolated Distributed Recording System to respond selectively to encoded acoustic waveforms by effecting a plurality of control actions at the isolated distributed recorders, said encoded acoustic waveforms having a unique signal characteristic;
  (b) transmitting said encoded acoustic waveforms utilizing an acoustic seismic energy source for the purpose of producing said control actions at said Isolated Distributed Recording System;
  (c) effecting said control actions at said Isolated Distributed Recording System in response to said transmitted encoded acoustic waveforms;
  (d) storing said encoded acoustic waveforms at least one isolated distributed recorder;
  (e) referencing the time of arrival of said stored encoded acoustic waveforms to the time said stored encoded acoustic waveforms were transmitted so that said encoded acoustic waveforms function to provide information for the selection and control of said isolated distributed recorders and also to provide seismic data concerning the sub-surface geology; and
  (f) changing said encoded acoustic waveform's unique signal characteristic and repeating steps b, c, d, and e for effecting a plurality of control actions at said Isolated Distributed Recording System and for gathering seismic data concerning the sub-surface geology.

15. A method for remotely gathering seismic data and controlling isolated distributed recorders in a seismic data gathering Isolated Distributed Recording System, comprising the steps of:
  (a) generating an encoded seismic signal utilizing an acoustic seismic energy source, said encoded seismic signal having a unique signal characteristic;
  (b) effecting at least one control action in response to said encoded seismic signal at at least one isolated distributed recorder located in a seismic data gathering Isolated Distributed Recording System;
  (c) storing and referencing the time of arrival at said isolated distributed recorder of said encoded seismic signal, including said encoded seismic signal's related waveforms, whereby said encoded seismic signal functions to provide information for the selection and control of said isolated distributed recorder and also functions to provide seismic data concerning the sub-surface geology; and
  (d) changing said encoded seismic signal's unique signal characteristic and repeating steps a, b, and c for the purpose of effecting at least one additional control action at said isolated distributed recorder and for the purpose of obtaining additional seismic data concerning the sub-surface geology.

16. The method of claim 1, 9, 14, or 15 wherein said control action consists of selecting the recorder's amplitude settings.

17. The method of claim 1, 9, 14, or 15 wherein said control action consists of selecting the recorder's phase settings.

18. The method of claim 1, 9, 14, or 15 wherein said control action consists of selecting the recorder's signal filter levels.

19. The method of claim 1, 9, 14, or 15 wherein said control action consists of selecting the recorder's rate for data gathering.

20. The method of claim 1, 9, 14, or 15 wherein said control action consists of selecting the recorder's recording mode ("on" or "off").

21. A system for gathering seismic data and for remotely controlling isolated distributed recorders in a seismic data gathering Isolated Distributed Recording System, comprising:
  (a) a source for transmitting an encoded acoustic waveform having a unique signal characteristic; and
  (b) an isolated distributed recorder for detecting said encoded acoustic waveform, said isolated distributed recorder being preconditioned to produce a desired control action in response to selected encoded acoustic waveforms, said isolated distributed recorder including:
    means for correlating said transmitted encoded acoustic waveform with at least one correlating encoded signal, said correlating encoded signal having a unique signal characteristic;
    means for producing a desired preselected control action upon correlation between said transmitted encoded acoustic waveform and said at least one correlating encoded signal;
    means for storing said detected encoded acoustic waveform at said isolated distributed recorder; and
    means for referencing the time of arrival at said isolated distributed recorder of said detected encoded acoustic waveform to the time said encoded acoustic waveform was generated by said source.

22. The system of claim 21 wherein said unique signal characteristic corresponds to a code based upon a version of a vibrator sweep.

23. A system for gathering seismic data and remotely controlling an Isolated Distributed Recording System, comprising:
  (a) a source for transmitting an encoded acoustic waveform having a unique signal characteristic corresponding to a binary code of maximal length; and
  (b) an isolated distributed recorder for detecting said encoded acoustic waveform and preconditioned so as to produce a desired control action in response to selected detected encoded acoustic waveforms, said isolated distributed recorder including:

means for correlating said transmitted encoded acoustic waveform with at least one correlating encoded signal, said correlating encoded signal having a unique signal characteristic in accordance with said binary code of maximal length;

means for producing a desired preselected control action upon correlation between said transmitted encoded acoustic waveform and said at least one correlating encoded signal;

means for storing said detected encoded acoustic waveform at said isolated distributed recorder; and means for referencing the time of arrival at said isolated distributed recorder of said detected encoded acoustic waveform to the time said encoded acoustic waveform was generated by said source.

24. The system of claims 23 or 27 wherein said encoded acoustic signal is generated by at least one controlled vibration means.

25. The system of claims 23 or 27 wherein said encoded acoustic signal is an encoded air-pressure wave.

26. A system for gathering seismic data and remotely controlling an Isolated Distributed Recording System, comprising:
(a) a source for transmitting an encoded acoustic signal having a unique signal characteristic; and
(b) an isolated distributed recorder for detecting said encoded acoustic signal, including said encoded acoustic signal's associated waveforms, and preconditioned so as to produce a desired control action in response to selected detected encoded acoustic signals, said isolated distributed recorder including:
means for correlating said transmitted encoded acoustic signal with at least one correlating encoded signal, said correlating encoded signal having a unique signal characteristic;
means for producing a desired preselected control action upon correlation between said transmitted encoded acoustic signal and said at least one correlating encoded signal;
means for storing said detected encoded acoustic signal, including said associated waveforms, at said isolated distributed recorder; and
means for referencing the time of arrival at said isolated distributed recorder of said detected encoded acoustic signal and said related waveforms to the time said detected encoded acoustic signal and said related waveforms were generated by said source so that said encoded acoustic signal and said related waveforms function to provide information for the selection and control of said isolated distributed recorder and also function to provide information concerning the sub-surface geology.

27. A seismic data gathering system, comprising:
(a) a source for generating and transmitting encoded seismic waveforms for use in said seismic data gathering system, said encoded seismic waveforms having a unique signal characteristics; and
(b) at least one isolated distributed recorder which includes:
means responsive to said encoded seismic waveforms for effecting at least one desired control action at said isolated distributed recorder; and
means for storing and time-referencing the time of arrival at said isolated distributed recorder of said encoded seismic waveforms so that said encoded seismic waveforms function to provide information for the selection and control of said isolated distributed recorder and also function to provide information concerning the sub-surface geology.

28. The system of claim 21, 23, 26, or 27 wherein said control action consists of selecting the recorder's amplitude setting.

29. The system of claim 21, 23, 26, or 27 wherein said control action consists of selecting the recorder's phase setting.

30. The system of claim 21, 23, 26, or 27 wherein said control action consists of selecting the recorder's signal filter levels.

31. The system of claim 21, 23, 26, or 27 wherein said control action consists of selecting the recorder's rate of data recording.

32. The system of claim 21, 23, 26, or 27 wherein said control action consists of selecting the recorder's recording mode ("on" or "off").

33. The method of claim 4, further comprising the step of:
(g) changing said unique encoded acoustic waveform's characteristics and repeating steps b, c, d, e, and f for purposes of effecting a plurality of control actions and gathering seismic data at said Isolated Distributed Recording System.

34. The method of claim 9, further comprising the step of:
(g) changing said unique encoded acoustic waveform's characteristics in accordance with said binary code of maximal length and repeating steps b, c, d, e, and f for the purposes of effecting a plurality of control actions and gathering seismic data at said Isolated Distributed Recording System.

* * * * *